United States Patent
Stewart

(10) Patent No.: US 9,341,646 B2
(45) Date of Patent: May 17, 2016

(54) BIAS REDUCTION IN FORCE REBALANCED ACCELEROMETERS

(71) Applicant: Robert E. Stewart, Woodland Hills, CA (US)

(72) Inventor: Robert E. Stewart, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 638 days.

(21) Appl. No.: 13/720,231

(22) Filed: Dec. 19, 2012

(65) Prior Publication Data

US 2014/0165691 A1    Jun. 19, 2014

(51) Int. Cl.
| | |
|---|---|
| G01P 15/00 | (2006.01) |
| G01P 21/00 | (2006.01) |
| G01P 15/13 | (2006.01) |
| G01P 15/125 | (2006.01) |

(52) U.S. Cl.
CPC .............. *G01P 21/00* (2013.01); *G01P 15/125* (2013.01); *G01P 15/131* (2013.01)

(58) Field of Classification Search
CPC ...... G01P 21/00; G01P 15/125; G01P 15/131
USPC .............. 73/1.38, 514.17, 514.18, 514.32
See application file for complete search history.

(56) References Cited

U.S. PATENT DOCUMENTS

| | | | |
|---|---|---|---|
| 4,679,434 A | | 7/1987 | Stewart |
| 4,987,779 A | * | 1/1991 | McBrien ............ 73/514.18 |
| 5,036,289 A | * | 7/1991 | Duran .................. 327/94 |
| 5,142,921 A | | 9/1992 | Stewart et al. |
| 5,377,545 A | * | 1/1995 | Norling et al. ........ 73/514.18 |
| 5,583,290 A | | 12/1996 | Lewis |
| 5,900,529 A | * | 5/1999 | Hanisko ............... G01P 21/00 73/1.38 |
| 5,932,803 A | * | 8/1999 | Wyse ................ 73/504.04 |
| 6,105,427 A | | 8/2000 | Stewart et al. |
| 6,109,114 A | | 8/2000 | Hartley et al. |
| 6,294,400 B1 | | 9/2001 | Stewart et al. |

(Continued)

FOREIGN PATENT DOCUMENTS

GB    2 251 693    7/1992

OTHER PUBLICATIONS

Park et al., Capacitive sensing type surface micromachined silicon accelerometer with a stiffness tuning capability, 1998, IEEE, pp. 637-642.*

*Primary Examiner* — John Fitzgerald
*Assistant Examiner* — Truong Phan
(74) *Attorney, Agent, or Firm* — Tarolli, Sundheim, Covell & Tummino LLP

(57) ABSTRACT

A system is provided for the continuous reduction, in real time, of bias in a force rebalanced accelerometers having a proof mass coupled to an accelerometer housing by a flexure suspension. The system comprises a closed loop, force rebalance servo that provides control voltage to the proof mass to null an electrical pickoff signal that indicates the motion of the proof mass with respect to the accelerometer housing, wherein a time varying disturbance signal is injected into the force rebalance servo that results in the generation of a time varying voltage in the output of the force rebalance servo that corresponds to a magnitude of the net positive spring of the combined flexure suspension and electrostatic springs acting on the proofmass. The system also comprises a negative electrostatic spring servo that applies a negative electrostatic spring DC voltage to each of a pair of negative electrostatic forcer electrodes.

23 Claims, 2 Drawing Sheets

(56) References Cited

U.S. PATENT DOCUMENTS

| | | | |
|---|---|---|---|
| 6,520,017 B1 * | 2/2003 | Schoefthaler | G01P 15/0802 73/514.02 |
| 6,701,786 B2 | 3/2004 | Hulsing, II | |
| 6,792,792 B2 * | 9/2004 | Babala | 73/1.38 |
| 6,934,660 B2 | 8/2005 | Painter et al. | |
| 6,966,225 B1 | 11/2005 | Mallary | |
| 7,640,786 B2 | 1/2010 | Stewart | |
| 2002/0184949 A1 * | 12/2002 | Gianchandani et al. | 73/514.29 |
| 2002/0189355 A1 | 12/2002 | Leonardson | |
| 2003/0010123 A1 * | 1/2003 | Malvern et al. | 73/514.32 |
| 2003/0200804 A1 * | 10/2003 | Johnson | 73/504.12 |
| 2012/0272711 A1 * | 11/2012 | Supino et al. | 73/1.38 |

* cited by examiner

BIAS REDUCTION IN FORCE REBALANCED ACCELEROMETERS

TECHNICAL FIELD

The present invention relates generally to inertial sensors, and more particularly to bias reduction in force rebalanced accelerometers.

BACKGROUND

One of the major sources of bias in force rebalanced accelerometers is due to the spatial separation between the pickoff electrical null and the proofmass flexure suspension mechanical null. In closed loop operation the force rebalance servo maintains the accelerometer proofmass at the pickoff null. The force required to hold the proofmass at the pickoff null against the combined forces of the mechanical and electrostatic springs of the deflected flexure suspension is seen as a bias error in the output of the accelerometer. In the current state-of-the-art, the accelerometer bias is measured and modeled over temperature during final calibration. The model is subsequently used to correct the measured acceleration for bias over temperature. The residual to the thermal model is an error that represents one of the limits to the performance capability of the inertial system. This residual error may be due to hysteresis or instability in the mechanical, electrical and thermal characteristics of the accelerometer. It is therefore desirable to minimize accelerometer bias and bias variation to improve inertial system performance, increase yield and reduce cost.

SUMMARY

In accordance with an aspect of the present invention, a system is provided for reducing bias and bias instability continuously in real time in a force rebalanced accelerometer having a proofmass coupled to an accelerometer housing by a flexure suspension and a pair of negative electrostatic forcer electrodes spaced apart from the proofmass on opposing sides. The system further comprises a force rebalance servo that applies a voltage to the proofmass in response to an electrical pickoff signal that is proportional to the displacement of the proofmass from the pickoff null position The applied voltage, in conjunction with DC bias voltages, generate electrostatic forces that counterbalance the mechanical, electrostatic and inertial forces acting on the proof mass to maintain the proof mass at the pickoff null. A time varying disturbance signal is injected into the force rebalance servo to displace the proof mass from the pickoff null position.

In the absence of acceleration, the output of the force rebalance servo is a time varying signal that is proportional to the magnitude of the forces of the combined positive spring of the flexure suspension and the negative spring associated with the bias voltages acting on the proof mass as it is moves back and forth about the pickoff null in response to the disturbance signal. The positive spring of the flexure suspension is, by design, larger than the negative spring associated with the bias voltages. In order to distinguish the disturbance signal from input acceleration, the disturbance signal has a pseudo random frequency characteristic. The system further comprises a negative electrostatic spring servo that uses the output of the force rebalance servo as a pickoff signal. This pickoff signal is demodulated with respect to the disturbance signal, amplified with integral gain and servo compensation and applied as a DC voltage to each of the pair of negative electrostatic forcer electrodes to provide a negative electrostatic spring that substantially cancels the net positive spring of the combined positive flexure suspension spring and negative spring associated with the bias voltages.

In accordance with another aspect of the present invention, a force rebalanced accelerometer system is provided. The accelerometer system comprises a proof mass coupled to an accelerometer housing by a flexure suspension and a pair of negative electrostatic forcer electrodes spaced apart from the proof mass on opposing sides. The accelerometer system also comprises a force rebalance servo that applies a voltage to the proof mass in response to an electrical pickoff signal that is proportional to displacement of the proof mass from the pickoff null position. The applied voltage, in conjunction with DC bias voltages, generate electrostatic forces that counterbalance the mechanical, electrostatic and inertial forces acting on the proof mass to maintain the proof mass at the pickoff null. A time varying disturbance signal is injected into the force rebalance servo to displace the proof mass from the pickoff null position. In the absence of acceleration, the output of the force rebalance servo is a time varying voltage that is proportional to the combined positive spring of the flexure suspension and the negative spring associated with the bias voltages acting on the proof mass as it moves back and forth about the pickoff null in response to the disturbance signal. The positive spring of the flexure suspension is, by design, larger than the negative spring associated with the bias voltages. In order to distinguish the disturbance signal from input acceleration, the disturbance signal has a pseudo random frequency characteristic. The system further comprises a negative electrostatic spring servo that uses the output of the force rebalance servo as a pickoff signal. This pickoff signal is demodulated with respect to the disturbance signal, amplified with integral gain and servo compensation and applied as a DC voltage to each of the pair of negative electrostatic forcer electrodes to provide a negative electrostatic spring that substantially cancels the net positive spring of the combined positive flexure suspension spring and negative spring associated with the bias voltages acting on the proof mass as it moves back and forth about the pickoff null in response to the disturbance signal.

In accordance with yet another aspect of the invention, a method is provided for reducing bias in force rebalance accelerometers having a proof mass coupled to an accelerometer housing by a flexure suspension and a pair of negative electrostatic forcer electrodes spaced apart from the proof mass on opposing sides. The method further comprises injecting a time varying disturbance signal into the force rebalance servo that results in a time varying output signal that corresponds in amplitude to a magnitude of the net positive spring of the combined flexure suspension and negative spring of the bias voltages acting on the proof mass as it moves back and forth about the pickoff null in response to the disturbance signal. The output of the force rebalance servo is applied as an input to the negative electrostatic spring servo which demodulates the applied signal with respect to the disturbance signal to generate a negative electrostatic spring DC voltage and apply it to each of a pair of negative electrostatic forcer electrodes to cancel the net positive spring of the combined flexure suspension and negative spring associated with the bias voltages.

DETAILED DESCRIPTION

The present invention is directed to continuous real time bias reduction of a force rebalanced accelerometer associated with offsets between the mechanical null of the flexure spring that supports the proofmass and the pickoff null due to mechanical tolerances and electronic offsets in a force rebalance servo. One of the major sources of bias in force rebalanced accelerometers is due to the spatial separation between the pickoff electrical null and the flexure suspension mechanical null. In closed loop operation, the force rebalance servo maintains the accelerometer proofmass at the pickoff electrical null. The force required to hold the proofmass at the pickoff electrical null against the positive mechanical spring of the flexure suspension and the negative electrostatic spring associated with the bias voltages is seen as a bias error in the output of the accelerometer.

In accordance with an aspect of the present invention, the net positive spring force acting on the accelerometer proofmass is reduced to zero by applying a negative electrostatic spring force of an equal magnitude to the proofmass. This eliminates the above source of bias since no force is required to maintain the proofmass at the electrical pickoff null when no acceleration is present. This is accomplished by summing a time varying disturbance signal into the force rebalance servo to slew the proofmass about the pickoff null. This disturbance signal can be a pseudo random signal that is distinguishable from normal input accelerations. Therefore, the force required to slew the proofmass appears as a known time varying bias in the accelerometer output of the force rebalance servo. This known time varying bias is used as a pickoff by the negative electrostatic spring servo and demodulated with respect to the null disturbance signal. The negative electrostatic spring servo applies a DC voltage to electrostatic negative spring electrodes, separate from the pickoff and forcer electrodes, to null the time varying bias in the accelerometer output. Furthermore, the negative electrostatic spring servo continuously (i.e., in real-time) adjusts the negative electrostatic spring to null the net positive mechanical spring of the flexure suspension and negative electrostatic spring associated with bias voltages, thereby reducing accelerometer bias and bias instability over temperature and over the life (age) of the accelerometer.

Figure 1:
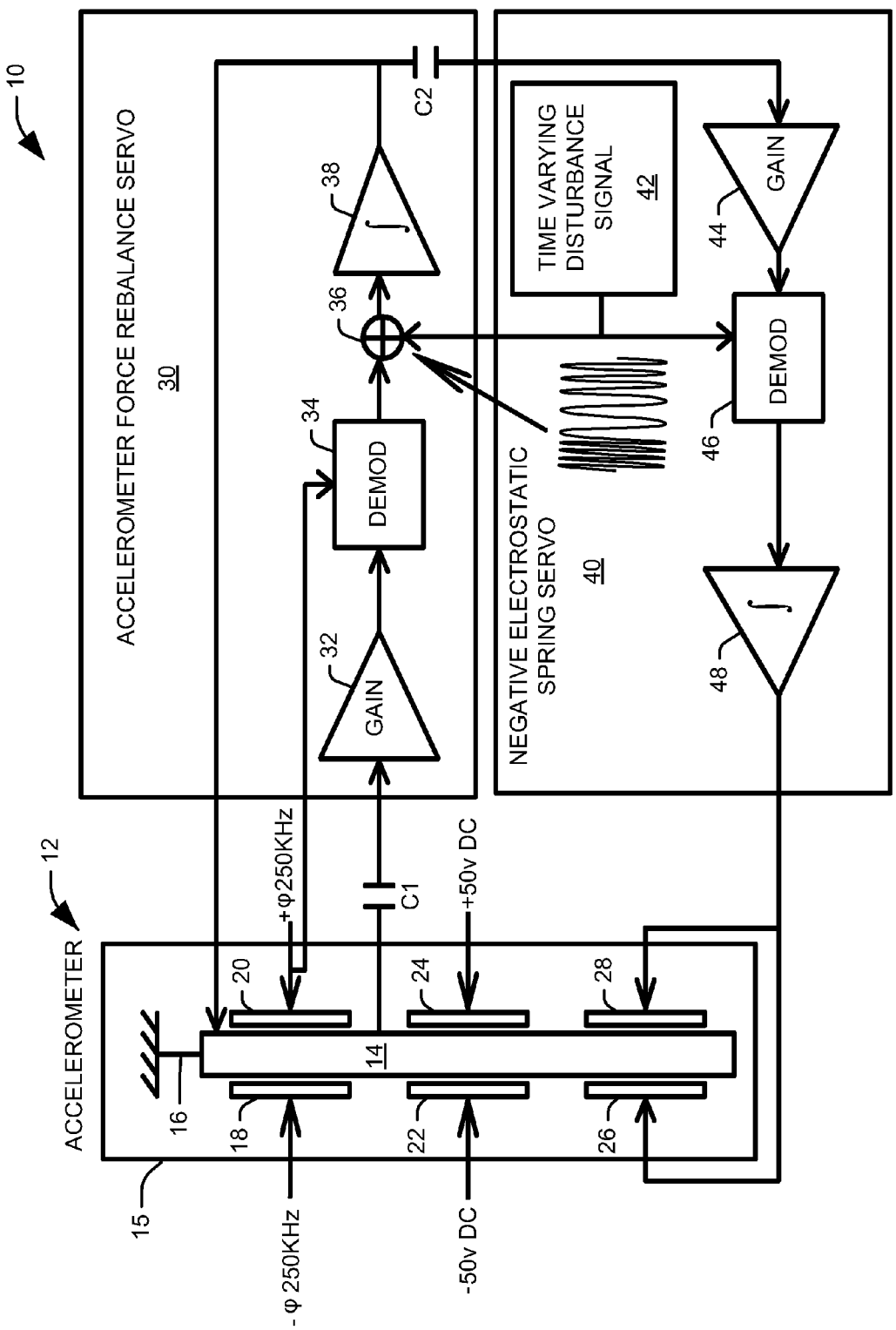
FIG. 1 illustrates a functional block diagram of a system for reducing bias in a force rebalance accelerometer in accordance with an aspect of the present invention.

FIG. 1 illustrates a system 10 for reducing bias in a force rebalanced accelerometer in accordance with an aspect of the present invention. The system 10 includes an accelerometer force rebalance servo 30 and a negative electrostatic spring servo 40 both coupled to an accelerometer 12. The accelerometer 12 includes a proof mass 14 coupled to an accelerometer housing 15 by a flexure suspension 16. The proof mass 14 can be formed of, for example, a single crystal silicon material that is doped to be conductive. The accelerometer 12 further includes a pair of electrostatic forcer electrodes 22 and 24 spaced apart from the proof mass 14 on opposing sides. A first electrostatic forcer electrode 22 is provided a first DC bias voltage (e.g., −50 v DC) and a second electrostatic forcer electrode 24 is provided a second DC bias voltage (e.g., +50 v DC).

In the present example, the first and second forcer electrodes 22 and 24 receive a DC voltage bias of equal and opposite polarity. However, other DC bias voltages could be employed as long as the first DC voltage is of opposite polarity than the second DC voltage, such that the force rebalanced servo voltage applied to the proof mass interacts with the first DC voltage and second DC voltage to move the proof mass to electrical null. The accelerometer 14 also includes a pair of capacitive pickoff excitation electrodes 18 and 20 that are each provided an AC excitation signal (e.g., +/−250 KHz) that are 180° out of phase with one another. It is to be appreciated that the electrostatic forcer electrodes 22 and 24 and the capacitive pickoff excitation electrodes 18 and 20 can be combined into a single pair of pickoff excitation/forcer electrodes as is known to those skilled in the art. It is also to be appreciated that other force rebalance methods can be employed such as digitally controlled pulse width modulated force rebalance.

Based on the position of the proofmass 14 with respect to the electrical null of the pickoff, a phase difference pickoff signal is generated from the proofmass 14 that indicates the direction and magnitude of the proofmass displacement. At electrical null, the pair of excitation signals cancels, and the pickoff signal is zero. However, if the pickoff signal is not null due to the displacement of the proofmass in response to acceleration and accelerometer bias, capacitance changes cause a pickoff signal to be provided to a gain amplifier 32 for amplification through a capacitor C1 for blocking DC components of the pickoff signal. The amplified pickoff signal is then demodulated by a demodulator 34 with respect to the AC excitation signal to produce an error signal that is integrated over time by a servo compensation amplifier 38. The servo compensation amplifier 38 then provides a voltage to the proofmass 14 that works in cooperation with the forcer DC voltage biases to move the proofmass 14 to the pickoff electrical null until the error signal input to the servo compensation amplifier 38 is nulled.

In accordance with an aspect of the invention, the accelerometer 12 further includes a pair of opposing negative electrostatic spring forcer electrodes 26 and 28. Each of the negative electrostatic forcer electrodes 26 and 28 receive a negative electrostatic spring DC voltage that generates an electrostatic force to induce a negative electrostatic spring of an equal magnitude to the net positive spring of the flexure suspension and negative spring of the forcer bias voltages. This is accomplished by injecting a time varying disturbance signal 42 into a summing node 36 that receives the error signal. The time varying disturbance signal 42 is a pseudo random frequency AC signal. The servo compensation amplifier 38 then provides a time varying voltage applied to the proofmass 14 that corresponds to the magnitude of the net positive spring of the flexure suspension and negative electrostatic spring of the forcer bias voltages. The time varying voltage causes the proofmass 14 to move back and forth about the pickoff null to essentially provide a measurement of the net positive spring of the flexure suspension 16 and the negative electrostatic spring associated with the ±50 v DC forcer bias voltages on forcer electrodes 22 and 24. The force rebalance servo 30 continuously adjusts the output voltage fed back to the proofmass 14 based on the pickoff signal until the proofmass 14 is maintained at the electrical pickoff null and the input to the servo compensation amplifier 38 is nulled.

The negative electrostatic spring servo 40 receives the output of the force rebalance servo 30 through capacitor C2 which is amplified by a gain amplifier 44 and demodulated by a demodulator 46 with respect to the time varying disturbance signal 42 to provide an error signal for the negative electrostatic spring servo 40. The error signal is integrated by a servo compensation amplifier 48 to provide a negative electrostatic spring DC voltage to each of the negative electrostatic forcer electrodes 26 and 28. The negative electrostatic spring servo 40 applies a DC voltage to electrostatic negative spring electrodes 26 and 28, separate from the pickoff electrodes 18 and 20 and the forcer electrodes 22 and 24, to null the time varying disturbance signal in the accelerometer output. Furthermore, the negative electrostatic spring servo 40 continuously (i.e., in real-time to account for temperature changes and aging) adjusts the negative electrostatic spring DC voltage to null the net positive mechanical spring of the flexure suspension 16 and the negative electrostatic spring associated with the ±50 v DC forcer bias voltages on forcer electrodes 22 and 24, thereby, continuously reducing accelerometer bias and bias instability in real time over the life of the accelerometer 12.

Figure 2:
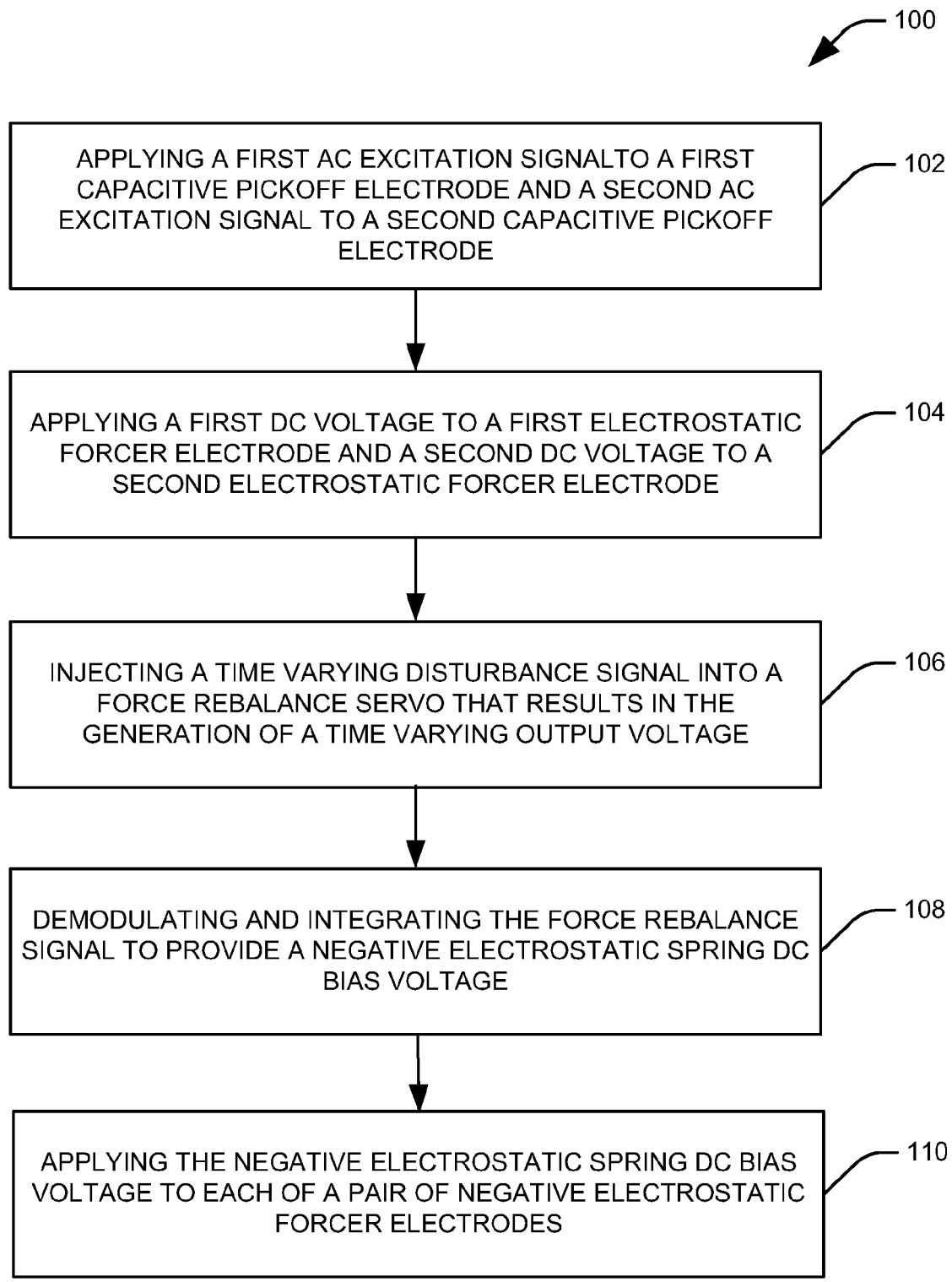
FIG. 2 illustrates a method for reducing bias in a force rebalance accelerometer in accordance with an aspect of the present invention.

In view of the foregoing structural and functional features described above, a methodology in accordance with various aspects of the present invention will be better appreciated with reference to FIG. 2. While, for purposes of simplicity of explanation, the methodology of FIG. 2 is shown and described as executing serially, it is to be understood and appreciated that the present invention is not limited by the illustrated order, as some aspects could, in accordance with the present invention, occur in different orders and/or concurrently with other aspects from that shown and described.

FIG. 2 illustrates a method 100 for reducing bias in an accelerometer in accordance with an aspect of the present invention. The accelerometer includes a proofmass coupled to an accelerometer housing by a flexure suspension and a pair of negative electrostatic forcer electrodes spaced apart from the proofmass on opposing sides. The method begins at 102 where a first AC excitation signal is applied to a first capacitive pickoff electrode and a second AC excitation signal is applied to a second capacitive pickoff electrode, wherein the first capacitive pickoff electrode and the second capacitive pickoff electrode are disposed at opposite sides of the proofmass and the first AC excitation signal is 180° out of phase with the second AC excitation signal. The methodology then proceeds to 104.

At 104, a first DC voltage is applied to a first electrostatic forcer electrode, and a second DC voltage is applied to a second electrostatic forcer electrode, wherein the first electrostatic forcer electrode and the second electrostatic forcer electrode are disposed at opposite sides of the proof mass and the first DC voltage is of opposite polarity than the second DC voltage, such that a DC voltage applied to the proof mass interacts with the first DC voltage and second DC voltage to move the proof mass to electrical null. The first capacitive pickoff electrode can be combined with the first electrostatic forcer electrode and the second capacitive pickoff electrode can be combined with the second electrostatic forcer electrode as is know in the art. The methodology then proceeds to 106.

At 106, a time varying disturbance signal is injected into a force rebalance servo that results in the generation of a time varying output voltage that corresponds to the magnitude of the net positive spring of the flexure suspension and negative electrostatic spring associated with the forcer bias voltages. The injected time varying disturbance signal causes the force rebalance servo to move the proof mass back and forth about the pickoff null. This causes a pickoff signal to be generated at the proof mass due to the motion of the proof mass and in response to capacitance changes and interaction with a first AC excitation signal applied to a first capacitive pickoff electrode and a second AC excitation signal applied to a second capacitive pickoff electrode. The pickoff signal is demodulated to produce an error voltage which is integrated to produce the force rebalance signal. At 108, the force rebalance signal is demodulated with respect to the time varying disturbance signal and amplified with integral gain and servo compensation to provide a negative electrostatic spring DC voltage. At 110, the negative electrostatic spring DC voltage is applied to each of the pair of negative electrostatic forcer electrodes to cancel the net positive spring of the flexure suspension and the negative electrostatic spring associated with the forcer bias voltages.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A system for reducing bias in an accelerometer having a proofmass coupled to an accelerometer housing by a flexure suspension and a pair of negative electrostatic forcer electrodes spaced apart from the proofmass on opposing sides, the system comprising:

a force rebalance servo that provides a control voltage to the proofmass in response to an electrical pickoff signal, the electrical pickoff signal indicating motion of the proofmass relative to the accelerometer housing, wherein a predetermined time varying disturbance signal is injected into the force rebalance servo that results in the generation of a time varying voltage in the control voltage, the time varying voltage corresponding to a magnitude of a net positive spring force of the combined flexure suspension and electrostatic spring associated with bias voltages acting on the proofmass as the proofmass moves in response to the time varying voltage in the control voltage; and a negative electrostatic spring servo that applies a negative electrostatic spring DC voltage to the pair of negative electrostatic forcer electrodes to cancel the net positive spring force of the combined flexure suspension and electrostatic spring associated with bias voltages acting on the proofmass in response to the nulling of the time varying voltage from the control voltage.

2. The system of claim 1, wherein the predetermined time varying disturbance signal is generated as a pseudorandom frequency AC signal.

3. The system of claim 1, wherein the negative electrostatic spring servo comprises a gain amplifier that amplifies a capacitance coupled version of the control voltage output from the force rebalance servo and a demodulator that demodulates the amplified capacitance coupled version of the control voltage with respect to the predetermined time varying disturbance signal.

4. The system of claim 3, wherein the negative electrostatic spring servo further comprises a servo compensation amplifier that integrates the demodulated amplified capacitance coupled version of the control voltage to provide the negative electrostatic spring DC voltage.

5. The system of claim 1, wherein the electrical pickoff signal is a phase difference signal generated at the proofmass in response to capacitance changes caused by the motion of the proofmass with respect to the accelerometer housing and interaction with a first AC excitation signal applied to a first capacitive pickoff electrode and a second AC excitation signal applied to a second capacitive pickoff electrode, wherein the first capacitive pickoff electrode and the second capacitive pickoff electrode are disposed at opposite sides of the proofmass and the first AC excitation signal is 180° out of phase with the second AC excitation signal.

6. The system of claim 5, wherein a first DC voltage is applied to a first electrostatic forcer electrode and a second DC voltage is applied to a second electrostatic forcer electrode, wherein the first electrostatic forcer electrode and the second electrostatic forcer electrode are disposed at opposite sides of the proofmass and the first DC voltage is of opposite polarity than the second DC voltage, such that the control voltage applied to the proofmass interacts with the first DC voltage and second DC voltage to generate an electrostatic force to move the proofmass to the pickoff electrical null.

7. The system of claim 5, wherein a first DC voltage is applied to the first capacitive pickoff electrode and a second DC voltage is applied to the second capacitive pickoff electrode, wherein the first DC voltage is of opposite polarity than the second DC voltage, such that the control voltage applied to the proofmass interacts with the first DC voltage and second DC voltage to generate an electrostatic force to move the proofmass to the pickoff electrical null.

8. The system of claim 5, wherein the force rebalance servo comprises a gain amplifier that amplifies the electrical pickoff signal and a demodulator that demodulates the amplified electrical pickoff signal with respect to the first AC excitation signal to generate an error voltage.

9. The system of claim 8, wherein the force rebalance servo comprises a servo compensation amplifier that integrates the error voltage to provide the control voltage to be applied to force rebalance the proofmass to the electrical pickoff null.

10. The system of claim 9, wherein the predetermined time varying disturbance signal is injected into a summing node with the error voltage to provide the control voltage comprising the time varying voltage to the servo compensation amplifier to force rebalance the proofmass to the electrical pickoff null.

11. An accelerometer system comprising:
a proofmass coupled to an accelerometer housing by a flexure suspension and a pair of negative electrostatic forcer electrodes spaced apart from the proofmass on opposing sides;
a force rebalance servo that provides a control voltage to the proofmass in response to an electrical pickoff signal that indicates motion of the proofmass relative to the accelerometer housing, wherein a predetermined time varying disturbance signal is injected into a summing node of the force rebalance servo that results in the generation of a time varying voltage in the control voltage, the time varying voltage corresponding to a magnitude of the net positive spring force of the combined flexure suspension and electrostatic spring associated with bias voltages acting on the proofmass as it moves in response to the control voltage; and
a negative electrostatic spring servo that applies a negative electrostatic spring DC voltage to each of the pair of negative electrostatic forcer electrodes to cancel the net positive spring of the combined flexure suspension and electrostatic spring associated with bias voltages acting on the proofmass in response to the nulling of the time varying voltage from the control voltage.

12. The system of claim 11, wherein the negative electrostatic spring servo comprises:
a gain amplifier that amplifies a capacitance coupled version of the control voltage output from the force rebalance servo;
a demodulator that demodulates the amplified capacitance coupled version of the control voltage with respect to the predetermined time varying disturbance signal; and
a servo compensation amplifier that integrates the amplified demodulated capacitance coupled version of the control voltage to provide the negative electrostatic spring DC voltage.

13. The system of claim 11, wherein the predetermined time varying disturbance signal is generated as a pseudorandom frequency AC signal.

14. The system of claim 11, wherein the electrical pickoff signal is a phase difference signal generated at the proofmass in response to a capacitance change caused by the motion of the proofmass with respect to the accelerometer housing and interaction with a first AC excitation signal applied to a first capacitive pickoff electrode and a second AC excitation signal applied to a second capacitive pickoff electrode, wherein the first capacitive pickoff electrode and the second capacitive pickoff electrode are disposed at opposite sides of the proofmass and the first AC excitation signal is 180° out of phase with the second AC excitation signal.

15. The system of claim 14, wherein a first DC voltage is applied to the first capacitive pickoff electrode and a second DC voltage is applied to the second capacitive pickoff electrode, wherein the first DC voltage is of opposite polarity than the second DC voltage, such that the control voltage applied to the proofmass interacts with the first DC voltage and second DC voltage to generate an electrostatic force to move the proofmass to the pickoff electrical null.

16. The system of claim 14, wherein a first DC voltage is applied to a first electrostatic forcer electrode and a second DC voltage is applied to a second electrostatic forcer electrode, wherein the first electrostatic forcer electrode and the second electrostatic forcer electrode are disposed at opposite sides of the proofmass and a first DC voltage is of opposite polarity than the second DC voltage, such that the control voltage applied to the proofmass interacts with the first DC voltage and second DC voltage to move the proofmass to the pickoff electrical null.

17. The system of claim 16, wherein the force rebalance servo comprises:
a gain amplifier that amplifies the electrical pickoff signal;
a demodulator that demodulates the amplified electrical pickoff signal to generate an error voltage based on the first AC excitation signal; and
a servo compensation amplifier that integrates the error voltage to provide a control voltage to be applied to the proofmass, wherein the predetermined time varying disturbance signal is injected into the summing node with the error voltage to provide the control voltage comprising the time varying voltage to the servo compensation amplifier to force rebalance the proofmass to the electrical pickoff null.

18. A method for reducing bias in an accelerometer having a proofmass coupled to an accelerometer housing by a flexure suspension and a pair of negative electrostatic forcer electrodes spaced apart from the proofmass on opposing sides, the method comprising:
injecting a predetermined time varying disturbance signal into a force rebalance servo that results in the generation of a control voltage that comprises a time varying voltage that corresponds to a magnitude of a net positive spring force of the combined flexure suspension and electrostatic spring associated with bias voltages acting on the proofmass as it the proofmass moves in response to the control voltage; and
applying a negative electrostatic spring DC voltage to each of a pair of negative electrostatic forcer electrodes to cancel the net positive spring of the combined flexure suspension and electrostatic spring associated with bias voltages acting on the proofmass in response to the nulling of the time varying voltage from the control voltage.

19. The method of claim 18, further comprising;
demodulating the control voltage with respect to the predetermined time varying disturbance signal;
integrating the demodulated control voltage to provide a negative electrostatic spring DC voltage; and
applying the negative electrostatic spring DC voltage to each of the pair of negative electrostatic forcer electrodes to cancel the net positive spring of the flexure suspension and electrostatic spring associated with bias voltages acting on the proofmass in response to time varying voltage from the control voltage.

20. The method of claim 18, further comprising:
applying a first AC excitation signal to a first capacitive pickoff electrode;
applying a second AC excitation signal to a second capacitive pickoff electrode, wherein the first capacitive pickoff electrode and the second capacitive pickoff electrode are disposed at opposite sides of the proofmass and the first AC excitation signal is 180° out of phase with the second AC excitation signal;
capturing and demodulating a phase difference pickoff signal generated at the proofmass in response to a capacitance change due to the motion of the proofmass with respect to the accelerometer housing and interaction with the first AC excitation signal and the second AC excitation signal to generate an error voltage; and
integrating the error voltage to generate the control voltage.

21. The method of claim 20, further comprising:
applying a first DC voltage to a first electrostatic forcer electrode; and
applying a second DC voltage to a second electrostatic forcer electrode, wherein the first electrostatic forcer electrode and the second electrostatic forcer electrode are disposed at opposite sides of the proofmass and the first DC voltage is of opposite polarity than the second DC voltage, such that the control voltage applied to the proofmass interacts with the first DC voltage and second DC voltage to generate an electrostatic force to move the proofmass to a pickoff electrical null.

22. The method of claim 20, further comprising:
applying a first DC voltage to the first capacitive pickoff electrode;
applying a second DC voltage to the second capacitive pickoff electrode, such that the control voltage applied to the proofmass interacts with the first DC voltage and second DC voltage to generate an electrostatic force to move the proofmass to the pickoff electrical null.

23. The method of claim 20, further comprising generating the predetermined time varying disturbance signal as a pseudorandom frequency AC signal.

* * * * *